United States Patent [19]

German

[11] Patent Number: 4,723,075
[45] Date of Patent: Feb. 2, 1988

[54] TRANSLATIONAL MOUNT FOR LARGE OPTICAL ELEMENTS

[75] Inventor: John D. German, Albuquerque, N. Mex.

[73] Assignee: The United States of America as represented by the Secretary of the Air Force, Washington, D.C.

[21] Appl. No.: 743,845

[22] Filed: Jun. 12, 1985

[51] Int. Cl.[4] .............................. G02B 7/00
[52] U.S. Cl. ..................... 250/231 SE; 350/247; 350/632
[58] Field of Search ............... 250/231; 350/632, 247; 370/81, 79; 128/303 B

[56] References Cited

U.S. PATENT DOCUMENTS

| | | | |
|---|---|---|---|
| 2,533,701 | 12/1950 | Watt et al. | 378/150 |
| 3,478,608 | 11/1969 | Met | 74/89.15 |
| 3,614,229 | 10/1971 | Denne | 378/81 |
| 3,728,541 | 4/1973 | Rabinovich et al. | 378/81 |
| 3,753,150 | 8/1973 | Zar | 331/94.5 |
| 4,639,589 | 1/1987 | Weber et al. | 250/236 |

FOREIGN PATENT DOCUMENTS 447762 10/1974 U.S.S.R. .................. 350/285
611166 6/1978 U.S.S.R. .................. 350/288

OTHER PUBLICATIONS

Ferguson, T. R. et al., "Conical Element Nomenclature, Use, and Metrology," Optical Engineering, vol. 21, No. 6, Nov./Dec. 1982, pp. 959–962.
Aerotech, Inc. Bulletin 200-283, 101 Zeta Drive, Pittsburgh, PA, 15238-2897, pp. 11 and 16.

Primary Examiner—Edward P. Westin
Assistant Examiner—Charles Wieland
Attorney, Agent, or Firm—Jacob N. Erlich; Donald J. Singer

[57] ABSTRACT

A translational mount for supporting large optical elements, the mount having a stationary support, a mounting ring pivotally attached to the support, a first eccentric ring rotatably mounted within the mounting ring, a second eccentric ring rotatably mounted within the first ring, and an element rotatably mounted within the second ring securing the large optical element thereto. By the appropriate rotational movement of the pair of eccentric rings the optical element is displaced a predetermined amount in both the horizontal and vertical directions.

18 Claims, 15 Drawing Figures

TRANSLATIONAL MOUNT FOR LARGE OPTICAL ELEMENTS

STATEMENT OF GOVERNMENT INTEREST

The invention described herein may be manufactured and used by or for the Government for governmental purposes without the payment of any royalty thereon.

BACKGROUND OF THE INVENTION

This invention relates generally to a translational mount for large optical elements, and, more particularly to a translational mount for mirrors utilized in high energy lasers wherein horizontal and vertical translation of the mirror is accomplished by means of rotation of two eccentric rotating rings.

In high energy lasers, it is often necessary to move very large, heavy mirrors to the left, right, up or down in order to align the center of the mirror with the center of the laser beam path (called the optical axis). Examples of the kinds of laser mirrors that require such two-axis translation can be found in a paper by T. R. Ferguson et al, "Conical Element Nomenclatur Use, and Metrology," *Optical Engineering*, Vol. 21 No. 6 Nov/Dec 1982, pp 959–962. In such laser applications the movement of the mirror must be very small, on the order of a few ten thousandths of an inch, and must be made very smoothly. Heretofore, the positioning of such large optical elements as mirrors in the horizontal and vertical directions orthogonal to its optical axis with the accuracy required for high energy laser applications is accomplished by combining two linear translation stages to produce the desired translations. Such commerically avaiable devices that perform large mirror alignment (such devices are commonly referred to as translation stages) are often too large and bulky to fit into the confined spaces dictated by laser design. Also, since these translation stages are based on sliding mechanisms, a form of friction called "sticktion" limits the smoothness with which they can align heavy mirrors.

More specifically, there are four inherent disadvantages with the utilization of conventional large optic translation mounts for use in high energy laser design. First of all, conventional mounts such as the AEROTECH SMART I CNC positioning table now in use are extremely large and bulky. They require clearances several times greater than the mirror alone would require, and they require clearance in all three dimensions. Since in most high energy laser applications, the components thereof are packed very tightly, conventional translation mounts are difficult to fit therein.

Secondly, the conventional mounts use the linear motion of sliding surfaces to achieve translation. For lightweight mirrors or lenses, such translational movement is perfectly adequate, but for the heavier optics as required in high energy laser systems this type of sliding mount creates the sticking friction which makes it increasingly difficult to achieve the smooth, fine motion that is required to position the optic (mirror or lens) to within the extremely small tolerances required.

Third, conventional mounts create a problem with coupling between two axes of motion. That is, if two separate translation mechanisms are required, one for the horizontal axis and one for the vertical axis they are generally not at right angles to each other. Therefore, motion along one axis will also produce some degree of motion along the other axis. This coupling between axes limits how accurately the mirror can be positioned and places very strict requirements on how the two translation stages must be attached.

The final design disadvantage of the prior art mounting arrangements include the amount of translation force which must be applied to the mirror or optical element. With conventional translation mounts, the optical element must be attached to the face of the mount. Consequently, the optical element (mirror) must be lifted by a force applied some distance from the mirror's center of gravity. This would be analogous to a person lifting a box with arms extended. The effect of such a configuration, for heavy mirrors, is an increase of vibration and friction associated with the sliding mechanisms of the past. Therefore, such arrangements substantially decrease the accuracy to which the mirror position can be held.

It therefore becomes abundantly clear that a need exists for an improved translational mount. In particular, such a translational mount must be capable of supporting large optical elements such as laser mirrors for translational movement in two directions.

SUMMARY OF THE INVENTION

The present invention overcomes the problems associated with past mounts for large optical elements as set forth in detail hereinabove, by providing a translational mount for large optical elements such as mirrors utilized for high energy laser resonators. The mount of the present invention provides horizontal and vertical translation of the optical element by incorporating therein a pair of eccentric rotating rings. Such an eccentric ring translation mount substantially reduces space requirements of the past and since no sliding movement is relied upon the problems of "sticktion" are substantially eliminated. In addition, the particular design of the present invention is capable of lifting the mirror or optical element from directly beneath its center of gravity and therefore is capable of easily and stably moving large weight optical elements.

The present invention incorporates therein a stationary mount or support to which is affixed a concentric outer mounting ring. Located within the outer mounting ring and rotatable with respect thereto is a first eccentric ring. A second eccentric ring is mounted within the first eccentric ring for rotatable movement with respect thereto. Finally, located within the second eccentric ring is the optical element in the form of, for example, a laser mirror which is to be adjustably mounted within the optical resonant cavity of the laser system.

These rings are driven in rotation by stepper motors which are, in turn, controlled by either a stepper motor controller or a small computer. In addition, a third stepper motor can be optionally used to provide a rotation to the optical element in order to keep the optical element in the same rotational orientation during the translational movement thereof. All three of these motors can be driven in a closed loop mode by incorporating therewith an optical alignment sensor, thereby allowing the optical element or mirror to be automatically driven to the position of best alignment.

It is therefore an object of this invention to provide an translational mount for large optical elements which is capable of moving an optical element in two directions by the combined rotation of two eccentric rings.

It is another object of this invention to provide a translational mount for large optical elements which has substantially reduced the weight requirements and space requirements of conventional mounts.

It is a further object of this invention to provide a translational mount for large optical elements which substantially eliminates the problem of friction.

It is still a further object of this invention to provide a translational mount for large optical elements which utilizes the movexent of a pair of eccentric rings in order to produce a predetermined final mirror position thereby producing extremely accurate mirror positioning It is an even further object of this invention to provide a translational mount for large optical elements which is designed to lift the optical element from directly beneath its center of gravity and thereby accommodate extremely heavy optical elements.

It is still another object of this invention to provide a translational mount for large optical elements which is economical to produce and which utilizes conventional, currently available components that lend themselves to standard mass producing manufacturing techniques.

For a better understanding of the present invention, together with other and further objects thereof, reference is now made to the following description taken in conjunction with the accompanying drawings and its scope will be pointed out in the appended claims.

DETAILED DESCRIPTION OF THE PREFERRED EMBODIMENT

Figure 1:
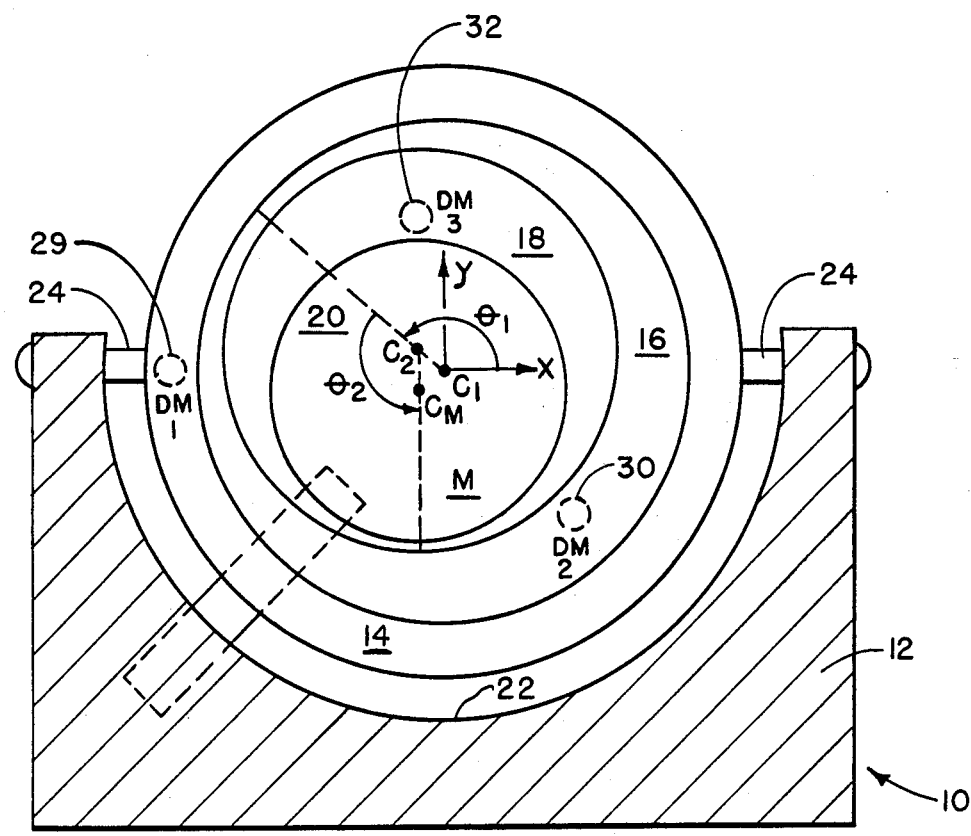
FIG. 1 is a front view, shown in schematic fashion and partly in cross section, of the translational mount for large optical elements of the present invention.
Figure 2:
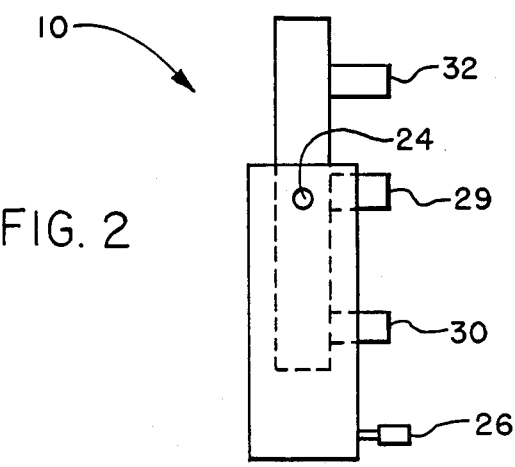
FIG. 2 is a schematic illustration of a side view of the translational mount for large optical elements of the present invention.
Figure 3:
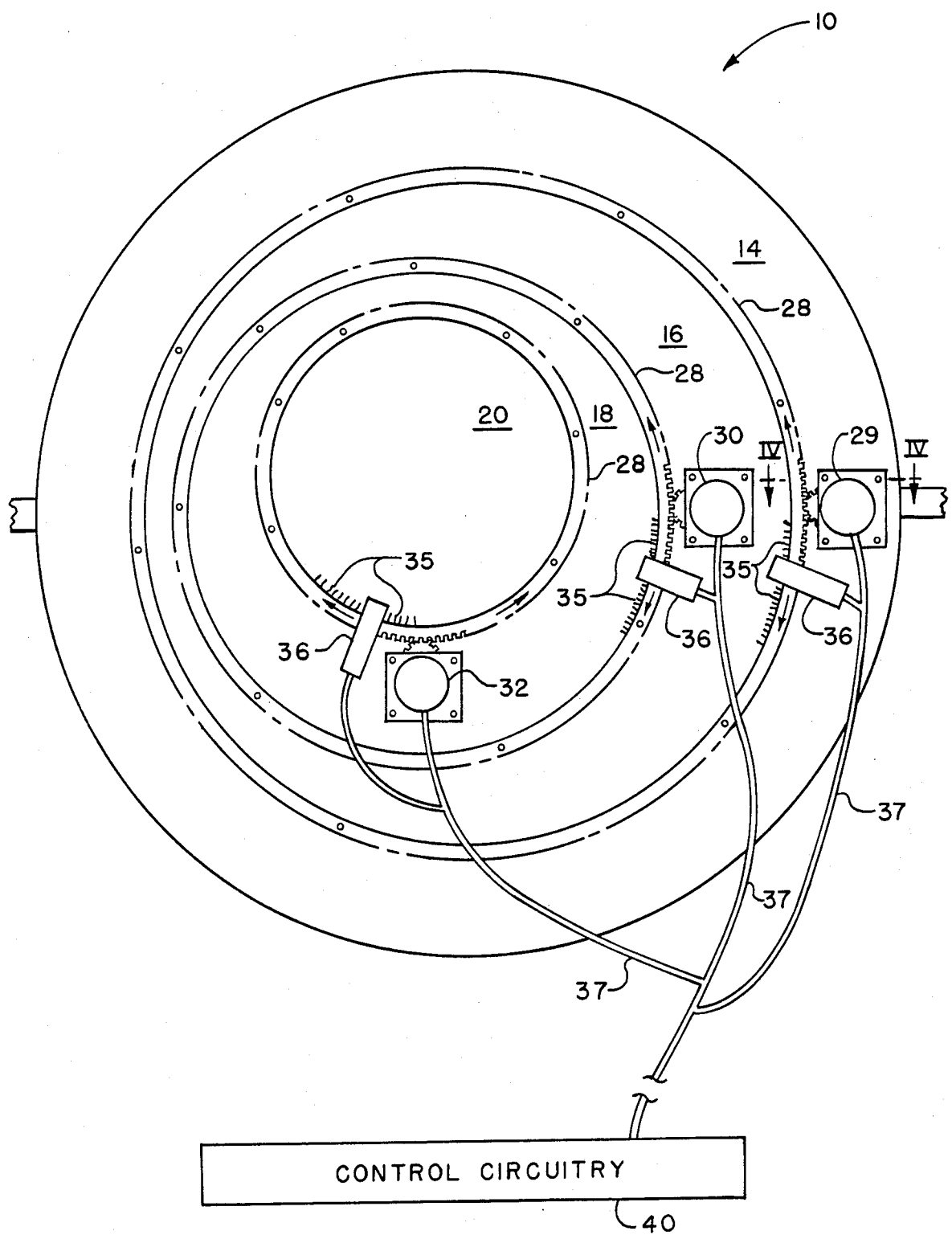
FIG. 3 is a rear view, shown in schematic fashion, of the translational mount for large optical elements of the present invention.

Reference is now made to FIGS. 1-3 of the drawings which clearly illustrate from three different views (front, side and rear) the translational mount 10 for large optical elements of the present invention. The translational mount 10 is made up of five major components; (1) a stationary support 12, (2) an outer mounting ring 14 which is pivotally mounted within the stationary support 12, (3) a first eccentric ring 16 mounted for rotation within outer ring 12, (4) a second eccentric ring 18 rotatably mounted within the first eccentric ring 16, and (5) a mount 20 for securing thereon a large optical element in the form of, for example mirror M for rotation within the second eccentric ring 18.

More specifically, the stationary support 12 has a semi-circular cut-out portion 22 formed therein in order to accept the outer mounting ring 14 together with the remaining components of the present invention. Forming part of the stationary mount 12 are a pair of supports 24 which are capable of securing thereto the outer mounting ring 14 for pivotal movement about the longitudinal axis of supports 24. Adjustment of this movement may be performed by the utilization of a pair of conventional tilt adjustable micrometers 26 shown in FIGS. 2 and 3 of the drawings.

Positioned for rotatable movement with respect to each other and mounted within the outer mounting ring 14 are the first eccentric ring 16, the second eccentric ring 18 and the mount 20 together with mirror M. These elements are held in position within the outer mounting ring and within each other by means of conventional ball bearing assemblies 27 illustrated, for example, between outer ring 14 and first eccentric ring 16 in FIG. 4 of the drawings. In addition, ring gears 28 are affixed adjacent the outer circumference of first eccentric ring 16, second eccentric ring 18 and mount 20 (see FIG. 4 as an example of such an arrangement).

Figure 4:
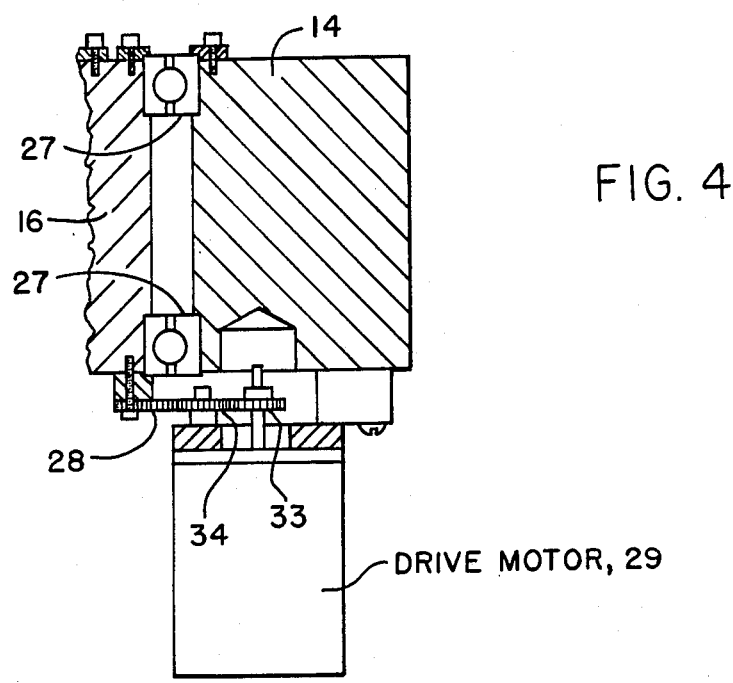
FIG. 4 is a top view, shown partly in cross-section, takin along line IV—IV of FIG. 3 of the translational mount for large optical elements of the present invention.

Still referring to FIG. 4 of the drawings, such ring gears 28 enable rings 16 and 18 and mount 20 to be rotated by means of a conventional stepper motors 29, 30 and 32, respectively, each of which have a drive gear 33 and spur gear 34 associated therewith. Since the exact makeup of the particular stepper motors 29, 30 and 32, drive gear 33 and spur gear 34 do not form part of the present invention greater description of these components are not deemed necessary. It should be realized, that these elements may be one of many which may be utilized in order to drive the various components such as the first eccentric ring 16, the second eccentric ring 18 and the mirror mount 20 with respect to each other.

More specifically, these components 16, 18 and 20 are driven in rotation by stepper motors 29, 30 and 32. The motors 29, 30 and 32 allow rotation between the components to be performed in a precise manner with the ring bearings 27 interposed between the components thus reducing the friction therebetween. The positioning accuracy of the present invention is limited only by the bearing play and the particular stepper motor drive system utilized therewith. Although stepper motor 32 is shown in the drawings this motor is included only as an option for those instances wherein the mount 20 and mirror M must be kept at a given rotational orientation as the two eccentric rings 16 and 18 rotate with respect to one another.

As shown in FIG. 3 of the drawings (rear view), improved accuracy of the rotation of the components with respect to one another can be accomplished by the use of a series of optical encoder marks 35 used with rings 16 and 18 and mount 20 in conjunction with sensors 36. This arrangement provides the exact amount of rotation of each of the components to be specifically determined. Information is transferred from sensors 36 to control the operation of stepper motors 29, 30 and 32 by means of cables 37 and any appropriate conventional control circuitry 40. An example of a commercially available optical encoder and sensing system as used with the present invention can be obtained, for example, from Teledyne Gurly of Troy, N.Y. and BEI Electronics, Inc., Digital Products Division, Little Rock, Ark.

Translational mount 10 of the present invention is utilized to align very large optical elements in the form of mirror M either to the left, right or up and down with accuracy in the order of a few ten thousandths of an inch. Such movement can be accomplished very smoothly and therefore can maintain the center of the mirror M in the optical beam path of, for example, a laser system.

Figure 5:
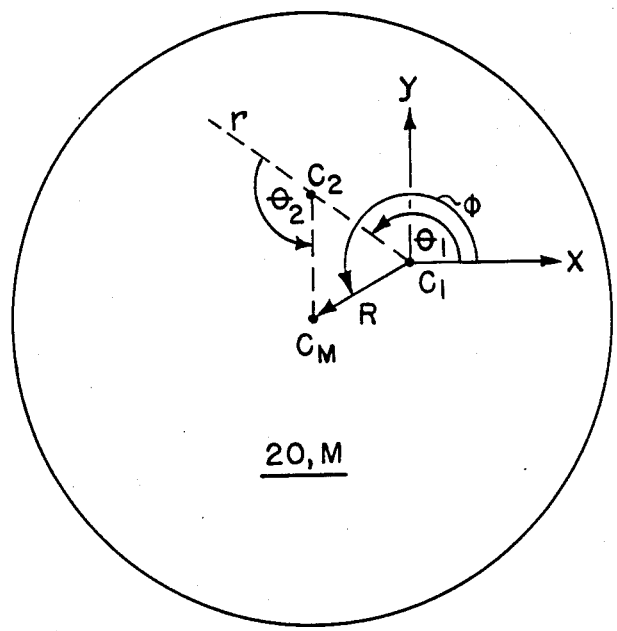
FIG. 5 is a schematic representation of the optical element (mirror) of the translational mount for large optical elements of the present invention illustrating its translational motion.
Figure 6:
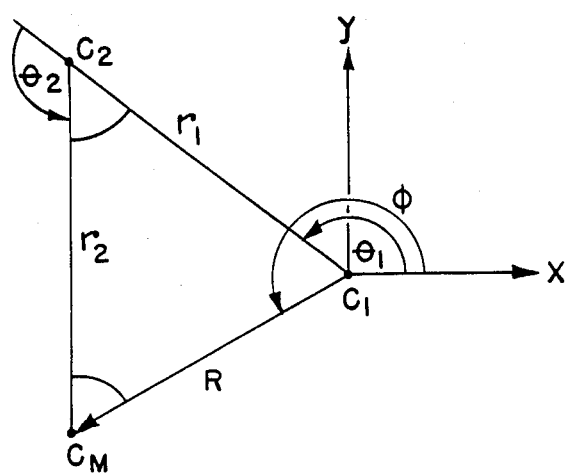
FIG. 6 is a schematic representation of the trigonometry involved in positioning the center of rotation of the eccentric rings and the mirror, respectively, of the translational mount for large optical elements of the present invention.

Reference is now made to FIGS. 1, 5 and 6 of the drawings in which the angles of rotation of each of the eccentric rings 16 and 18, respectively, are designated as $\theta_1$ and $\theta_2$ and are measured relative to an index mark on each ring. As pointed out above, the stepper drive motor for the first eccentric ring 16 is designated by element 29, the stepper drive motor for the second eccentric ring 18 is designated by element 30 and the optional stepper or drive motor for the zeroing of the mirror rotation is designated by element 32. $C_1$ indicates the center of rotation of the first eccentric ring 16, $C_2$ represents the center of rotation of the second eccentric ring 18 and $C_M$ represents the center of rotation of the mirror mount 20 or mirror M, that is, the desired optic axis.

In operation, the user (or a feedback signal) provides input information to the stepper motors 29, 30 and optionally 32. The stepper motors respond thereto by driving the eccentric rings 16 and 18 to specified angular positions resulting in a net x and y translation of the mirror axis $C_M$. The particular movement of mirror M will be more clearly explained hereinbelow.

Specifically, FIG. 5 is an expanded view of mirror mount 20 or mirror M while FIG. 6 is an even more detailed illustration of the location of the two centers of rotation $C_1$ and $C_2$, the mirror center $C_M$ and the two angles of rotation $\theta_1$ and $\theta_2$ of the first and second eccentric rings 16 and 18, respectively. If $r_1$ and $r_2$ (as shown in FIG. 6) are the eccentric offset distances of the center of the first and second eccentric rings 16 and 18, respectively, and $R \sphericalangle$ describes the position of the mirror center $C_M$ (in polar coordinate vector notation) with respect to the mount center $C_1$, then there is some combination of $\theta_1$ and $\theta_2$ that will put $C_M$ at any point inside a circle about $C_1$ with a radius $\sqrt{r_1^2 + r_2^2}$. For the normal case where $r_1 = r_2 = r$, that radius is $\sqrt{2}r$.

To relate this to a particular value of x and y translation, $$x = 2r \cos(\theta_2/2) \cdot \cos(\theta_1 + \theta_2/2)$$

$$y = 2r \cos(\theta_2/2) \cdot \sin(\theta_1 + \theta_2/2)$$

The inverse relationship is easily derived from the above equations and the trigonometry identities for CosA.CosB and CosA.SinB are as follows:

$$\theta_2 = 2 \cos^{-1}(\sqrt{(x^2 + y^2)}/2r)$$

$$\theta_1 = \tan^{-1}(y/x) - \cos^{-1}(\sqrt{(x^2 + y^2)}/2r)$$

In use, the desired values of x and y are used to derive the required rotational positions $\theta_1$ and $\theta_2$ of the rings 16 and 18, respectively.

Reference is now made to FIGS. 7-15 of the drawings in order to even more simplify the understanding of the above equations and the particular required rotation of the eccentric rings 16 and 18 in order to provide the appropriate left, right, up or down movement of the center $C_M$ of mirror 20. In this analysis of the present invention, FIGS. 7-10 will represent a mirror mount 20' located within a single eccentric ring 18' and FIGS. 11-15 will represent the actual dual eccentric ring version of the present invention wherein the eccentric rings will be designated 16' and 18' and mirror mount will be designated 20' (mirror M).

Figure 7:
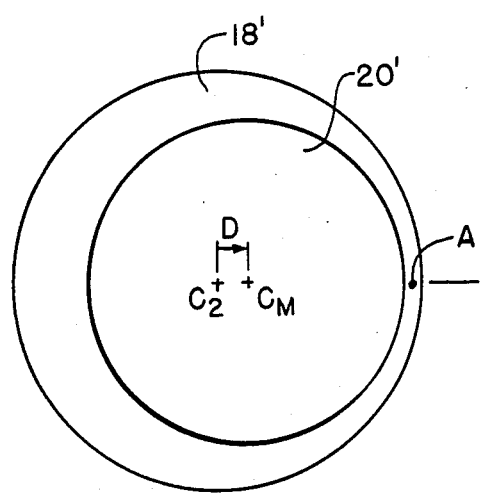
FIGS. 7-15 are schematic representations of the movement of the optical element (mirror) located within the two eccentric rings of the translational mount for large optical elements of the present invention in its various degrees of movement in establishing the position of the optical element.
Figure 8:
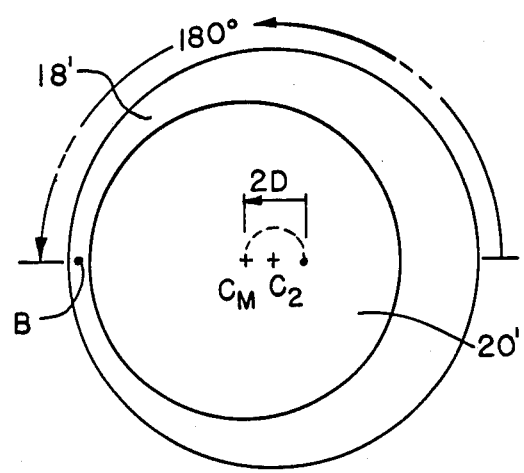

First, let us examine the motion of mirror mount 20' mounted inside a single rotating eccentric ring 18' as depicted in FIGS. 7-10 of the drawings. As ring 18' rotates from its intial position A (0° degree rotational position) to a position B, an angular movement of 180° as illustrated in FIGS. 7 and 8 of the drawings, the center of the mirror mount $C_M$ which is situated within eccentric ring 18' moves from its starting position to a point some distance 2D to the left of its starting point (see FIG. 8). The net effect on mirror mount 20' is a translation to the left a distance 2D.

Figure 9:
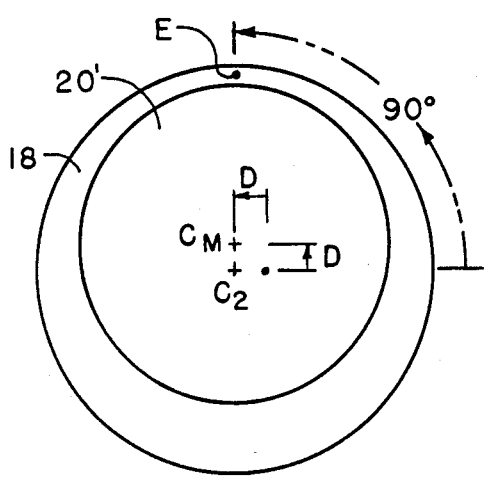
Figure 10:
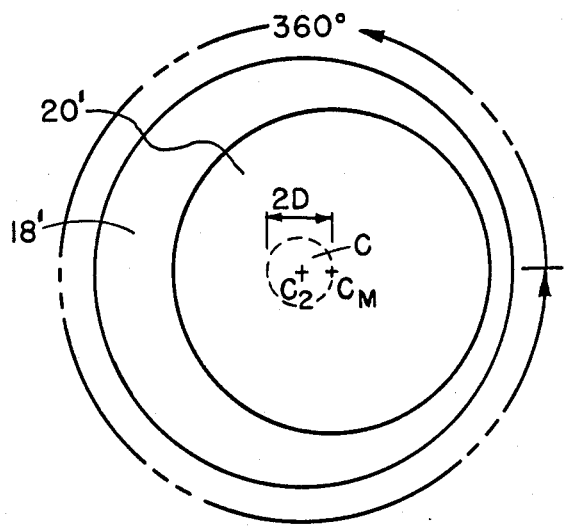

To further understand this process, consider this same eccentric ring 18' that rotates to point E an angle of only 90° as illustrated in FIG. 9 of the drawings. In this case the mirror center $C_M$ moves to a new position a distance D to the left of and D above its original position. Applying this reasoning to any angle of rotation it is clear that the center $C_M$ of mirror mount 20' can be moved to any point on a circle of diameter 2D. This is clearly shown in FIG. 10 of the drawings.

Figure 11:
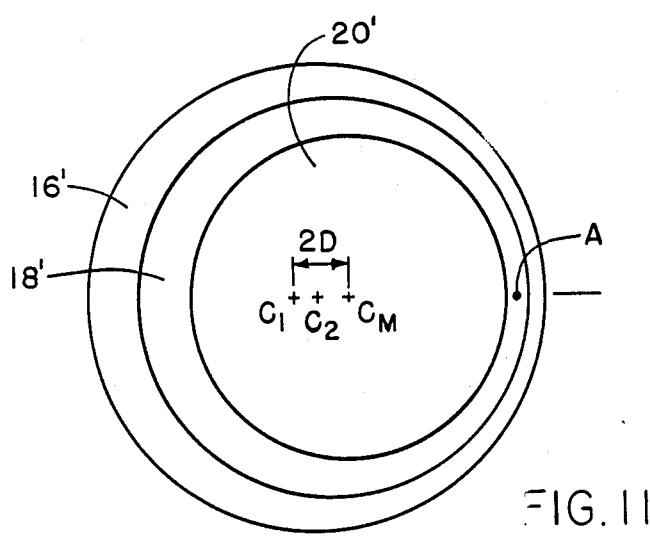
Figure 12:
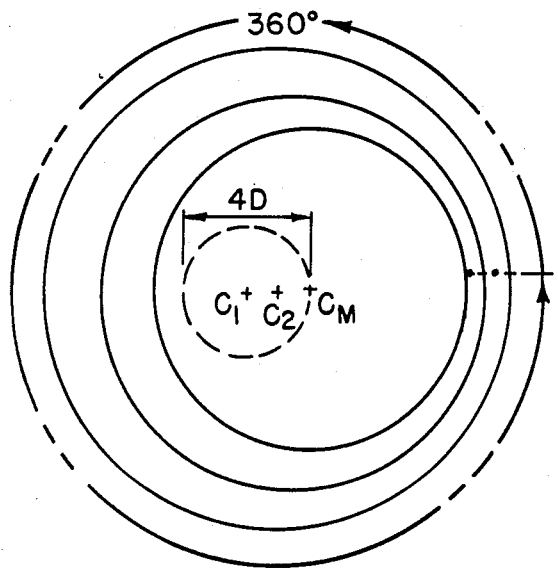
Figure 13:
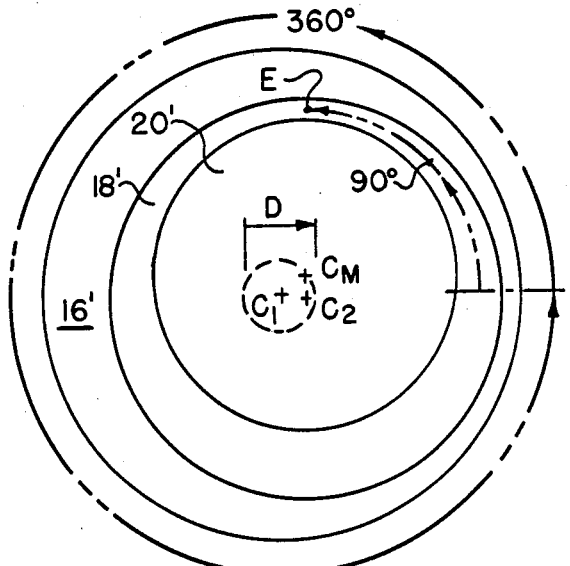

However, to be of use in mirror alignment as with the present invention, the present invention must be capable of moving the center $C_M$ of mirror mount 20' to any point not only on but also within the above mentioned circle C of diameter 2D. To apply this added capability, another rotating eccentric ring 16' is added to the outside of eccentric ring 18' as shown in FIG. 11 of the drawings. To see how this added ring 16' will permit translation to any point inside circle C, inner ring 18' is started at point A at rotation of zero degrees as shown in FIG. 11. This positioning places the center of the mirror mount $C_M$ at the same point as it was in FIG. 7. Now, if the outer eccentric ring 16' rotates a full 360° as shown in FIG. 12 of the drawings, the center of the mirror mount $C_M$ can be anywhere on a new circle diameter of 4D. Thereafter, if inner ring 18' is rotated to its 90° position E and outer ring 16' is rotated to 360° as shown in FIG. 13 of the drawings, the center $C_M$ of the mirror mount can now be anywhere on a circle of a diameter $2\sqrt{2D}$ (or 2.83D) as clearly illustrated in FIG. 13.

Figure 14:
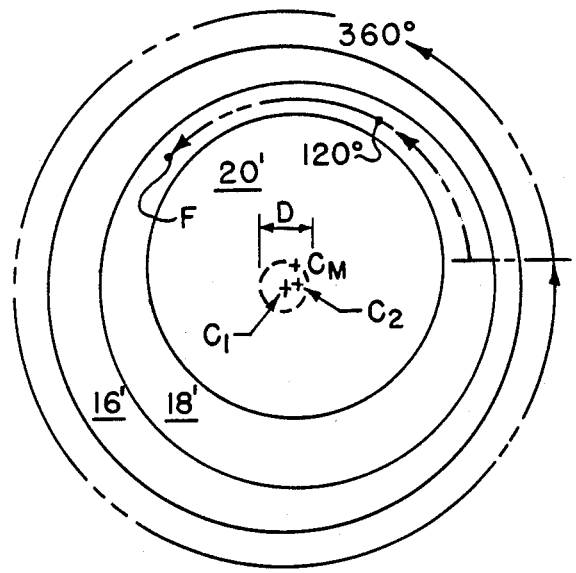
Figure 15:
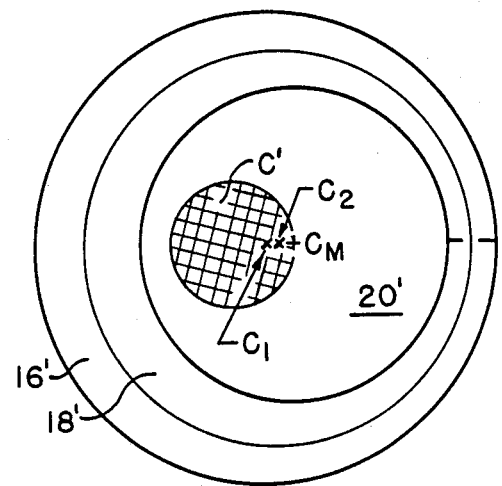

Applying this reasoning to one more example if inner ring 18' rotates to position F through 120° and ring 16' is once again rotated to 360° as shown in FIG. 14 of the drawings, the center $C_M$ of mirror mount 20' can be anywhere on a circle of diameter D, or an even smaller circle than before.

It is therefore clearly evident, as the initial rotation angle of the inner ring 18' gets closer to 180° the circle of possible locations of the mirror mount center $C_M$ gets smaller and smaller. In fact, if the inner ring 18' is rotated exactly 180°, the mirror center will coincide with the center of rotation and will be stationary as the outer ring 16' is rotated. It is therefore clear that by choosing some combination of rotation angles for the inner and outer eccentric rings 18' and 16', respectively, the center of the mirror mount or mirror M can be placed anywhere within a circle C' of diameter 4D. This particular circle is clearly shown in FIG. 15 of the drawings.

Mathematically, the final reasoning set forth hereinabove can once again be summarized as follows. If we let the symbols x and y represent the horizontal and vertical position of the mirror center, and $\theta_1$ and $\theta_2$ represent the rotation angles of the inner and outer eccentric rings, then the equations that describe the position of the mirror center are as follows:

$$x = 2r \cos(\theta_2/2) \cdot \cos(\theta_1 + \theta_2/2)$$

$$y = 2r \cos(\theta_2/2) \cdot \sin(\theta_1 + \theta_2/2)$$

The present invention incorporates a specific constructional design which enables each eccentric ring to rotate one within the other. The positioning motors 29 and 30 are linked to each of the eccentric rings 16 and 18, respectively, through a gearing system or the like illustrated in FIGS. 3 and 4 of the drawings. This creates the basic translational movement to be achieved in which the mirror M is moved by adjusting the electrical input to the two positioning motors 29 and 30. This type of operation is called an open loop operation where when an operator moves the mirrors, observes the effect on the laser (not shown) in which the mirror system is contained and then moves the mirror M again if necessary.

A more useful type of operation is referred to as the closed loop system in which a system is incorporated within the present invention which measures the position of rotation of the two eccentric rings 16 and 18, respectively, and mirror mount 20 or mirror M. This system compares this rotation to the desired position requested by an operator by means of a series of optical encoder marks 35 and optical sensors 36 as illustrated in FIG. 3 of the drawings. Such information can be utilized to automatically move the mirror mount 20 or mirror M to the requested or desired position.

More specifically, optical encoder marks 35 are made up of a series of coded black and white stripes which are attached to each eccentric ring. The position of the rings are read by the sensors 36 in the form of, for example, photocells. The position read by the sensors 36 is fed into a conventional electronic control system of the type utilized with past positioning tables such as the AEROTECH SMART I CNC. This control system compares the movement of rings 16 and 18 to specific operator inputs in order to drive the positioning motors forward or backward as necessary.

As pointed out above, the one final design criteria which may be necessary in the present invention is motor 32 which is utilized to rotate the mirror mount 20 or mirror M about itself. In some instances the mirror M which is positioned on mount 20 is not exactly circularly symetric. In such a case mirror M (together with mount 20) must not be allowed to rotate as the two eccentric rings 16 and 18 rotate to position mirror M. In order to keep mirror M from rotating optional stepper motor 32 is operably connected to mirror mount 20 so as to enable the same spot on mirror M to be repositioned by the eccentric rings 16 and 18.

With the present invention it is possible to now mount heavy, large optical elements such as mirrors in a small space and to translate a particular point or spot on such an optical element in either the x or y direction with high accuracy. There is no sliding movement involved within the system of the present invention and all of the rotation takes place within a small space. Since eccentric rings are utilized, one within the other, the present invention is capable of lifting the mirror mount 20 and mirror M from directly beneath its center of gravity and therefore is capable of accurately positioning such a mirror even though the mirror may be of extremely heavy weight.

Although this invention has been described with reference to a particular embodiment, it will be understood that this invention is also capable of further and other embodiments within the spirit and scope of the appended claims.

I claim:

1. A mount for supporting an element for predetermined translational movement in a single plane in a vertical and horizontal direction, said mount comprising:
    a stationary support;
    a mounting ring positioned within said support;
    a first eccentric ring rotatbly mounted within said mounting ring;
    a second eccentric ring rotatably mounted within said first eccentric ring;
    means mounted directly within said second eccentric ring for translational movement only in a single plane and for securing said element thereto;
    first means operably associated with said eccentric ring for rotating said first eccentric ring a predetermined amount with respect to said mounting ring;
    second means operably associated with said second eccentric ring for rotating said second eccentric ring a predetermined amount with respect to said first eccentric ring; and
    means operably associated with said first and said second eccentric rings for detecting the amount of rotation of each of said rings, respectively, and for providing output signals in accordance therewith;
    whereby selective rotation of said first and said second eccentric rings by said first and said second rotating means, respectively, causes said element to move translationally only in a single plane a predetermined distance in said horizontal and said vertical direction.

2. A mount as defined in claim 1 wherein said element is in the form of a large optical element.

3. A mount as defined in claim 1 wherein said element securing means is rotatably mounted within said second eccentric ring.

4. A mount as defined in claim 2 further comprising means associated with said element securing means for rotating said element securing means with respect to said second eccentric ring.

5. A mount as defined in claim 1 further comprising means for receiving said output signals and controlling the operation of said first and said second rotating means in accordance therewith.

6. A mount as defined in claim 1 wherein said mounting ring is pivotally mounted within said support.

7. A mount as defined in claim 4 further comprising means operably associated with said element securing means for detecting the amount of rotation of said element securing means and for providing an output signal in accordance therewith.

8. A mount as defined in claim 7 further comprising means for receiving said output signal from said detecting means associated with said element securing means and controlling the operation of said rotating means of said element securing means in accordance therewith.

9. A mount as defined in claim 1 wherein said first eccentric ring is rotatably held within said mounting ring by a first ball bearing assembly and said second eccentric ring is rotatably held within said first eccentric ring by a second ball bearing assembly.

10. A mount as defined in claim 4 wherein said element securing means is rotatably held within said second eccentric ring by a ball bearing assembly.

11. A mount as defined in claim 1 wherein said detecting means comprises a plurality of encoder marks on each of said first and said second eccentric rings and means for sensing the movement of said marks.

12. A mount as defined in claim 1 wherein said first and said second rotating means comprises a first and a second stepper motor, respectively.

13. A mount as defined in claim 12 further comprising a first and a second ring gear connected to the periphery of said first and said second eccentric rings, respectively, and a first and a second drive gear connected to said first and said second stepper motors, respectively.

14. A mount as defined in claim 12 wherein said first stepper motor is attached to said mounting ring and said second stepper motor is attached to said first eccentric ring.

15. A mount as defined in claim 14 further comprising means for receiving said output signals and controlling the operation of said first and said second rotating means in accordance therewith.

16. A mount as defined in claim 15 further comprising means operably associated with said element securing means for detecting the amount of rotation of said element securing means and for providing an output signal in accordance therewith.

17. A mount as defined in claim 16 further comprising means for receiving said output signal from said detecting means associated with said element securing means and controlling the operation of said rotating means of said element securing means in accordance therewith.

18. A mount as defined in claim 17 wherein said first eccentric ring is rotatably held within said mounting ring by a first ball bearing assembly and said second eccentric ring is rotatably held within said first eccentric ring by a second ball bearing assembly.

* * * * *